(12) United States Patent
Hall et al.

(10) Patent No.: US 7,268,697 B2
(45) Date of Patent: Sep. 11, 2007

(54) LATERALLY TRANSLATABLE DATA TRANSMISSION APPARATUS

(75) Inventors: David R. Hall, Provo, UT (US); H. Tracy Hall, Jr., Provo, UT (US); Tyson J. Wilde, Provo, UT (US); Paul M. Schramm, Provo, UT (US)

(73) Assignee: IntelliServ, Inc., Provo, UT (US)

( * ) Notice: Subject to any disclaimer, the term of this patent is extended or adjusted under 35 U.S.C. 154(b) by 307 days.

(21) Appl. No.: 11/161,031

(22) Filed: Jul. 20, 2005

(65) Prior Publication Data

US 2007/0018847 A1     Jan. 25, 2007

(51) Int. Cl.
*G01V 3/00* (2006.01)

(52) U.S. Cl. .............................. 340/854.8; 340/854.3; 367/82; 439/32; 439/217; 439/218; 439/191; 200/252

(58) Field of Classification Search .................. 367/82; 340/854.3, 854.8; 341/16; 439/32, 217, 439/218, 191; 200/252, 258
See application file for complete search history.

(56) References Cited

U.S. PATENT DOCUMENTS

| | | | |
|---|---|---|---|
| 2,414,719 A | | 1/1947 | Cloud |
| 3,518,606 A | | 6/1970 | Papadopoulos |
| 4,739,325 A | | 4/1988 | MacLeod |
| 4,788,544 A | | 11/1988 | Howard |
| 5,931,681 A | * | 8/1999 | Thomassin et al. ............ 439/25 |
| 6,012,015 A | | 1/2000 | Tubel |
| 6,148,933 A | | 11/2000 | Hay et al. |
| 6,247,542 B1 | | 6/2001 | Kruspe et al. |
| 6,252,518 B1 | | 6/2001 | Laborde |
| 6,392,317 B1 | | 5/2002 | Hall et al. |
| 6,402,524 B2 | * | 6/2002 | Wurm et al. .................. 439/10 |
| 6,540,032 B1 | | 4/2003 | Krueger |
| 6,670,880 B1 | | 12/2003 | Hall et al. |
| 6,688,396 B2 | | 2/2004 | Floerke et al. |
| 6,717,501 B2 | | 4/2004 | Hall et al. |
| 6,799,632 B2 | | 10/2004 | Hall et al. |
| 6,821,147 B1 | | 11/2004 | Hall et al. |
| 6,830,467 B2 | | 12/2004 | Hall et al. |
| 6,844,498 B2 | | 1/2005 | Hall et al. |
| 6,866,306 B2 | | 3/2005 | Boyle et al. |
| 6,888,473 B1 | | 5/2005 | Hall et al. |
| 6,913,093 B2 | | 7/2005 | Hall et al. |
| 6,929,493 B2 | | 8/2005 | Hall et al. |

(Continued)

OTHER PUBLICATIONS

PCT/US03/16475, Published Dec. 4, 2003, Applicant Baker Hughes; International Search Report: "Documents Considered to Be Relevant".

*Primary Examiner*—Albert K. Wong
(74) *Attorney, Agent, or Firm*—Jeffery E. Daly

(57) ABSTRACT

A data transmission apparatus having first and second electrical conductors is disclosed. The first and second electrical conductors are disposed within recesses of a first and second complementary surfaces that are magnetically conducting and electrically insulating. The first and second surfaces are in close proximity to each other. The first surface is translatable along the length of the second surface. The first and second electrical conductors are in electromagnetic communication and provide for the transmission of data or power from the first electrical conductor to the second electrical conductor as the first surface overlaps the second surface. The data transmission apparatus may be located in one or more downhole tools.

26 Claims, 14 Drawing Sheets

U.S. PATENT DOCUMENTS

| | | |
|---|---|---|
| 6,945,802 B2 | 9/2005 | Hall et al. |
| 2004/0039466 A1 | 2/2004 | Lilly et al. |
| 2004/0104797 A1 | 6/2004 | Hall et al. |
| 2004/0113808 A1 | 6/2004 | Hall et al. |
| 2004/0145492 A1 | 7/2004 | Hall et al. |
| 2004/0150532 A1 | 8/2004 | Hall et al. |
| 2004/0164833 A1 | 8/2004 | Hall et al. |
| 2004/0164838 A1 | 8/2004 | Hall et al. |
| 2004/0216847 A1 | 11/2004 | Hall et al. |
| 2004/0244916 A1 | 12/2004 | Hall et al. |
| 2004/0244964 A1 | 12/2004 | Hall et al. |
| 2004/0246142 A1 | 12/2004 | Hall et al. |
| 2005/0001735 A1 | 1/2005 | Hall et al. |
| 2005/0001738 A1 | 1/2005 | Hall et al. |
| 2005/0035874 A1 | 2/2005 | Hall et al. |
| 2005/0035875 A1 | 2/2005 | Hall et al. |
| 2005/0035878 A1 | 2/2005 | Hall et al. |
| 2005/0036507 A1 | 2/2005 | Hall et al. |
| 2005/0039912 A1 | 2/2005 | Hall et al. |
| 2005/0045339 A1 | 3/2005 | Hall et al. |
| 2005/0045580 A1 | 3/2005 | Hall et al. |
| 2005/0046586 A1 | 3/2005 | Hall et al. |
| 2005/0067159 A1 | 3/2005 | Hall et al. |
| 2005/0070144 A1 | 3/2005 | Hall et al. |
| 2005/0082092 A1 | 4/2005 | Hall et al. |
| 2005/0092499 A1 | 5/2005 | Hall et al. |
| 2005/0093298 A1 | 5/2005 | Hall et al. |
| 2005/0095827 A1 | 5/2005 | Hall et al. |
| 2005/0115717 A1 | 6/2005 | Hall et al. |
| 2005/0145406 A1 | 7/2005 | Hall et al. |
| 2005/0150653 A1 | 7/2005 | Hall et al. |
| 2005/0161215 A1 | 7/2005 | Hall et al. |
| 2005/0173128 A1 | 8/2005 | Hall et al. |
| 2005/0212530 A1 | 9/2005 | Hall et al. |
| 2005/0236160 A1 | 10/2005 | Hall et al. |

\* cited by examiner

LATERALLY TRANSLATABLE DATA TRANSMISSION APPARATUS

BACKGROUND OF THE INVENTION

1. Field of the Invention

The present invention relates to the field of data transmission apparatus, methods, and systems. More specifically, it relates to the field of laterally translatable downhole data transmission apparatus.

2. Description of the Related Art

Downhole drilling and production well operations usually have an objective of locating and extracting useful fluids and/or gases such as hydrocarbons or water from underground formations.

Many attempts in the art have been made to optimize the drilling process by enabling the transmission of data along the tool string. Several problems arise in this endeavor. For example, a tool string generally comprises a plurality of tool string components that are attached to each other through joints of mated threads. As tool string components are often being added to and taken away from the tool string, it is generally impractical to transmit data through the tool string using a continuous wireline approach. Furthermore, drilling mud and other fluids are generally circulated through the tool string. These fluids, whether electrically conductive or electrically insulating, may impede, inhibit, or short out electrical signals—especially when they are exposed to electrical contacts.

One approach to downhole data transmission that attempts to overcome the aforementioned complications involves the use of inductive couplers to transmit electrical signals between tool joints in a tool string. The inductive coupler system described in U.S. Pat. No. 6,670,880 by Hall, et al., and herein incorporated by reference for all it discloses, has been particularly successful in overcoming several of the challenges associated with transmitting data signals through a tool string.

In some tools, such as downhole motors, jars, and shock absorbers, it may become necessary to transmit an electrical signal through components that move relative to each other. Some attempts to solve this problem are known in the art. For example, U.S. Pat. No. 6,540,032, to Krueger, discloses an apparatus for power and data transfer over a gap between rotating and non-rotating members of downhole oilfield tools by means of an inductive coupling. An electronic control circuit associated with the rotating member controls the transfer of power and data from the rotating member to the non-rotating member.

U.S. patent Ser. No. 10/653,604 filed on 2 Sep. 2003 to Hall, et al. discloses using a coiled coaxial cable for transmission of data through a mandrel that translates axially with respect to a housing. The coiled coaxial cable acts as a mechanical spring.

BRIEF SUMMARY OF THE INVENTION

A data transmission apparatus comprises a first electrical conductor disposed within a first recess of a first magnetically conducting, electrically insulating complementary surface and a second electrical conductor disposed within a second recess of a second magnetically conducting, electrically insulating complementary surface. The first surface is translatable along the length of the second surface, and data transmission between the electrical conductors is enabled as the first surface overlaps the second surface. The electrical conductors may be embedded in a dielectric material having low magnetic permeability that fills the recess.

The magnetically conducting, electrically insulating surfaces may be generally rectangular in shape with the length dimension greater than the width dimension. The magnetically conductive, electrically insulating surfaces may comprise ferrites, magnetically conductive materials covered in an electrically insulating layer, or metallic dust suspended in a dielectric material. The magnetically conductive, electrically insulating surfaces may further comprise a plurality of magnetically conductive, electrically insulating segments, each segment comprising a recess to house a portion of the electrical conductor.

Each of the electrical conductors may comprise a first end in electrical communication with a data conductor and a second end in electrical communication with ground. The data conductors may interlink more than one electrical device. The data conductors may be coaxial cables, twin axial cables, twisted wires, or other data conductors.

The first and second magnetically conductive, electrically insulating surfaces face each other and conform closely to each other in such a manner as to allow translation relative to each other. The surfaces may further comprise a void inside an area enclosed by the first and second electrical conductors. Either surface is laterally translatable with respect to the opposing surface in a manner so as to maintain electromagnetic communication between the first and second electrical conductors throughout the allowed range of motion.

The data transmission apparatus may be located in any downhole tool. Tools that may particularly benefit from the invention include jars, shock absorbers, mud hammers, air hammers, mud motors, and turbines. Other tools that may benefit from the invention include reamers, under-reamers, fishing tools, steering elements, MWD tools, LWD tools, seismic sources, seismic receivers, pumps, perforators, other tools with an explosive charge, and mud-pulse sirens.

DETAILED DESCRIPTION OF THE INVENTION AND THE PREFERRED EMBODIMENT

The attached figures in which like elements are labeled with like numerals and the following description of said figures are intended to illustrate certain embodiments of the invention and not to limit its scope.

Figure 1:
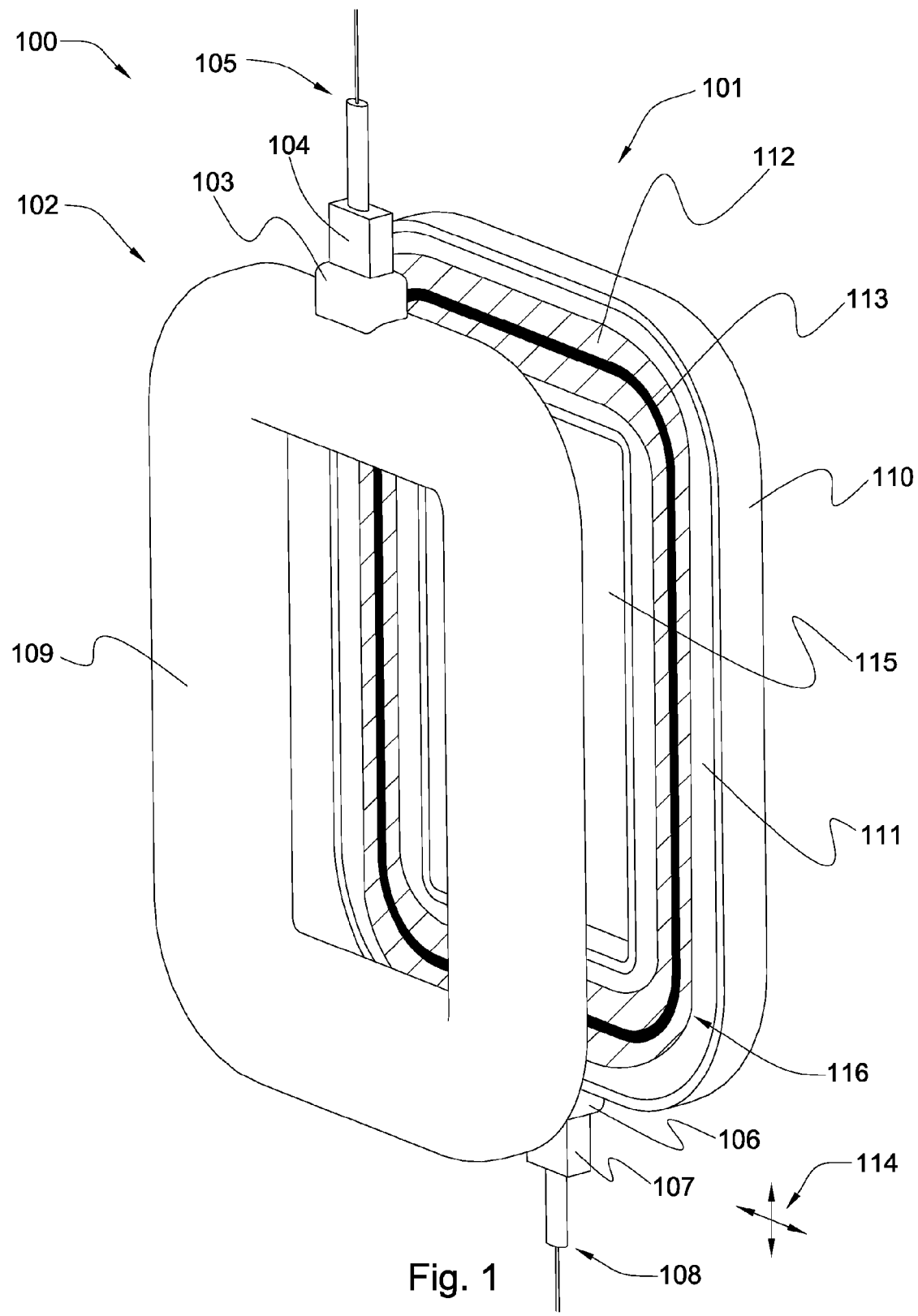
FIG. 1 is a perspective view of a data transmission apparatus.

Referring to FIG. 1, a preferred embodiment of a data transmission apparatus 100 consistent with the present invention comprises a pair of inductive couplers 101, 102 in electromagnetic communication with each other. Inductive coupler 102 may be very similar to inductive coupler 101. Inductive coupler 101 comprises an electrical conductor 113 disposed within a recess 116 of a magnetically conductive electrically insulating (MCEI) surface 111. In this embodiment, the electrical conductor 113 comprises a single-turn electrical coil.

The substantially flat MCEI surface 111 is substantially rectangular in shape. Any one of a number of MCEI materials such as ferrites, magnetically conductive materials covered in an electrically insulating layer, metal powder suspended in a dielectric material, and combinations thereof may comprise the magnetically conductive electrically insulating surface 111. The electrical conductor 113 is embedded in a dielectric material 112 having low magnetic permeability that fills the recess 116 in the surface 111. Thereby magnetic flux arising from a current in the electrical conductor 113 is more prone to follow a path defined within the MCEI material of the MCEI surface 111 than through the dielectric material 112. The magnetic permeability of the dielectric should be substantially less than that of the MCEI material; most preferably it should be close to that of air ($\mu_r=1$).

The MCEI surface 111 may define an area 115 enclosed by its dimensions. In the current embodiment, the area 115 is empty. In other embodiments, the area 115 may be filled with one or more materials and maintain a continuously flat surface. (See FIG. 10 for an illustration of such an embodiment).

Inductive couplers 101, 102 comprise data conductors 108, 105 such as coaxial cables that may be enclosed in conduits 107, 104. In other embodiments, the data conductors 108, 105 may be twin axial cables, two or more twisted wires, or other data conductors. Connectors 106, 103 may be provided to facilitate connection of data conductors 108, 105 with inductive couplers 101, 102.

MCEI surface 111 is substantially parallel to a two-dimensional plane 114 defined by coordinate axes. Couplers 101, 102 move parallel to plane 114.

Figure 2:
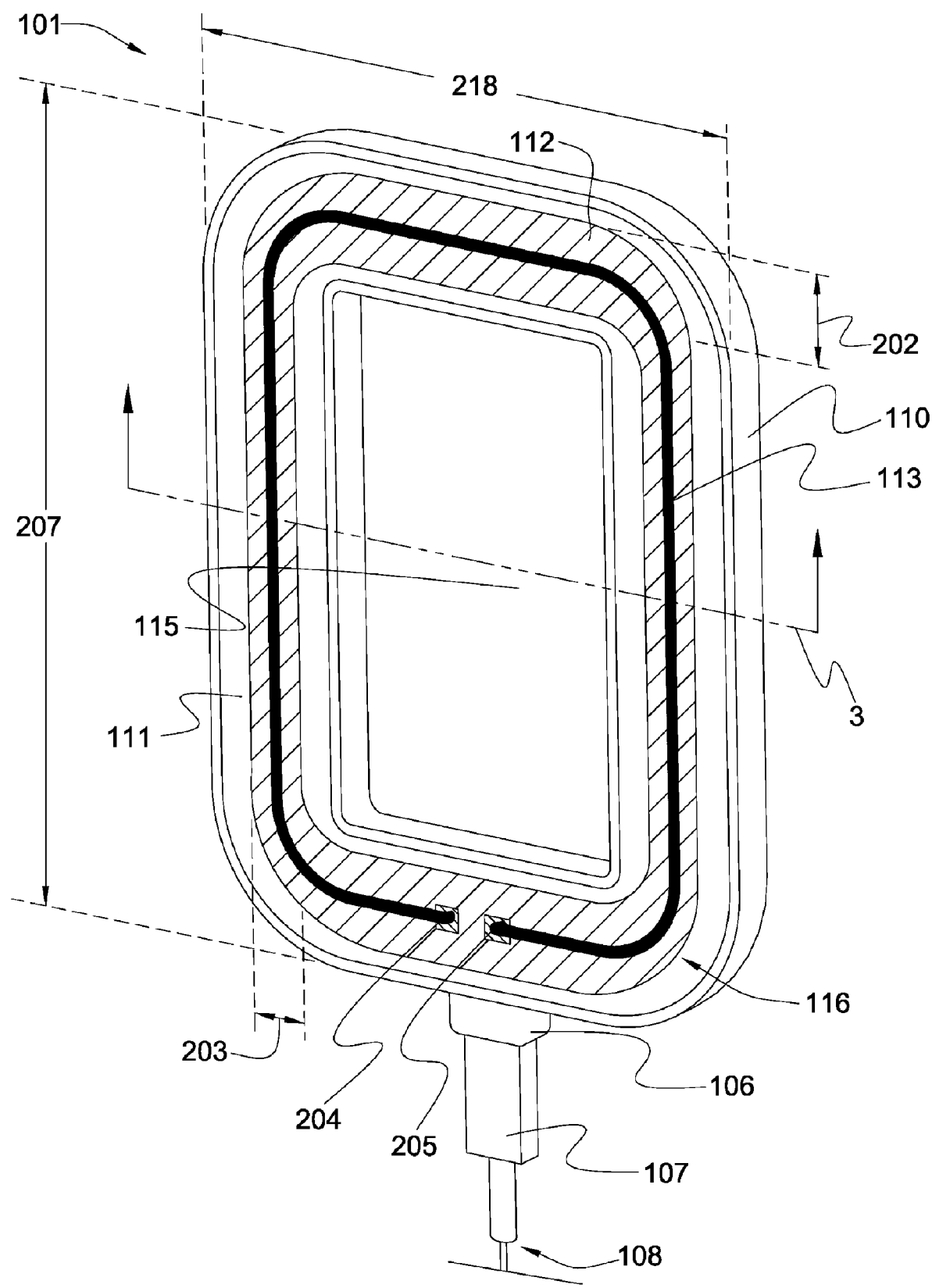
FIG. 2 is a perspective view of an inductive coupler in a data transmission apparatus.

Referring now to FIG. 2, inductive coupler 101 is shown by itself for clarity. The recess 116 in the MCEI surface 111 comprises a width 202 that is greater along the width dimension 218 of the MCEI surface 111 than its width 203 along the dimension 207. A first end 205 of the electrical conductor 113 connects electrically with data conductor 108. A second end 204 of the electrical conductor 113 connects electrically with ground. The housing 110 of the inductive coupler 101 is also connected to electrical ground. In this manner, an electrical data or power signal may be transferred from the data conductor 108 to the first end 205 of the electrical conductor 113, through the electrical conductor 113 to the second end 204 and ground potential.

As the electrical data or power signal passes through the electrical conductor 113, a representation of that signal is induced in the other inductive coupler 102. In one specific embodiment, the data conductor 108 is a coaxial cable with inner and outer conductors. In such an embodiment, the inner conductor of the coaxial cable carries the data or power signal and connects with the first end 205 of the electrical conductor 113. The outer conductor is at ground potential and connects electrically with the second end 204. Arrows 3 indicate the location of the cross-sectional view depicted in FIG. 3.

Figure 3:
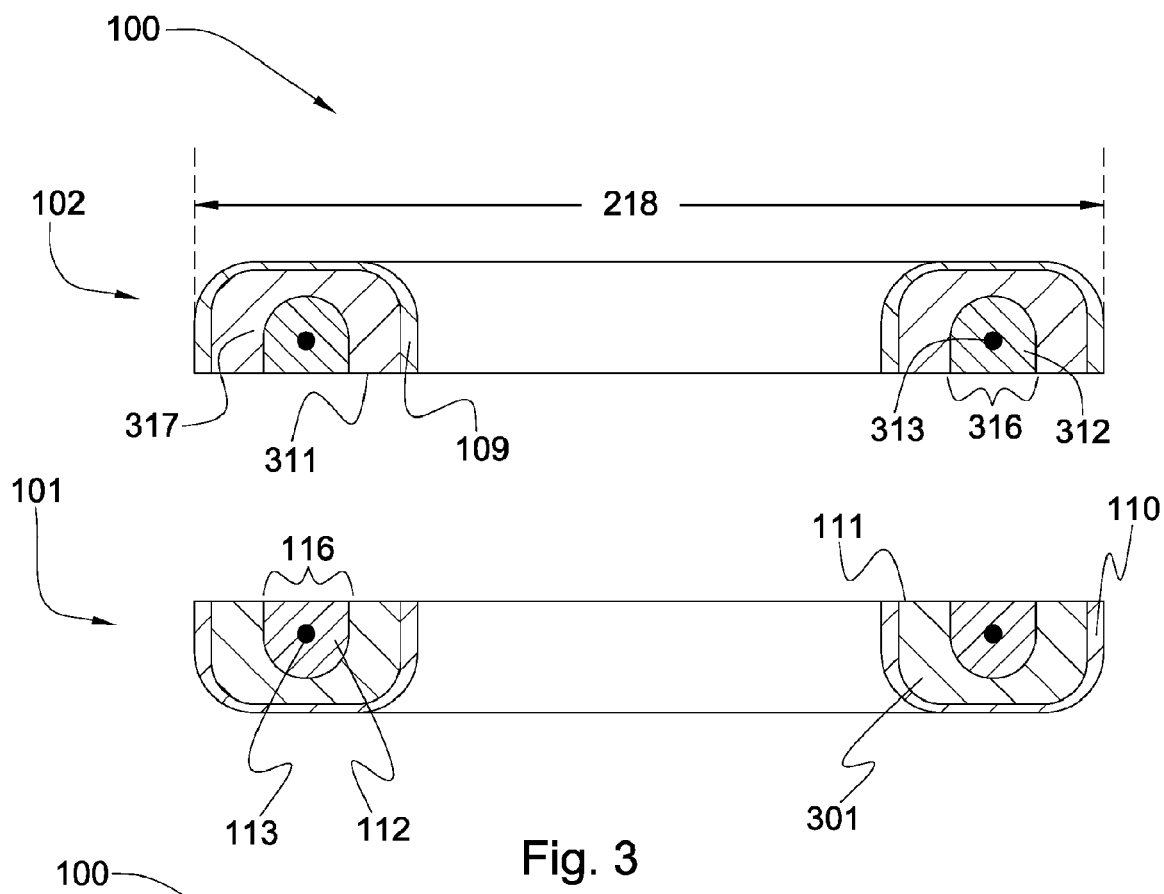
FIG. 3 is a top cross-sectional view of a data transmission apparatus with two inductive couplers.

Referring now to FIG. 3, the data transmission apparatus 100 of FIG. 1 is shown in cross-section along width dimension 218 of the couplers 101, 102. The dielectric material 112 of inductive coupler 101 and dielectric 312 of coupler 102 fill recess 116 of coupler 101 and recess 316 of coupler 102, respectively. Complementary MCEI surfaces 111, 311 comprise MCEI material 301, 317 that extends beneath and around the recesses 116, 316. This material 301, 317 provides a magnetic path for flux to follow when mutual currents are flowing through electrical conductor 113 of coupler 101 and electrical conductor 313 of coupler 102, respectively Data and/or power transmission is enabled as the first complementary surface 111 overlaps the second complementary surface 311.

Figure 4:
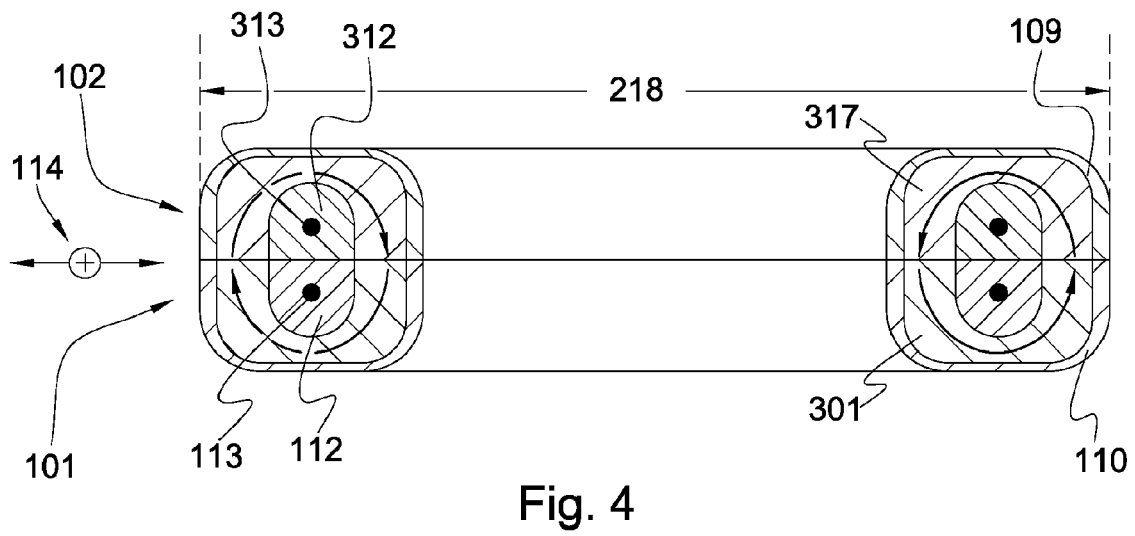
FIG. 4 is a top cross-sectional view of a data transmission apparatus wherein the two inductive couplers are in electromagnetic communication.

Referring now to FIG. 4, a cross-sectional view along width dimension 218 of the data transmission apparatus 100 of FIG. 1 is shown. The complementary MCEI surfaces 111, 311 of the inductive couplers 101, 102 should be overlapping and in closest possible proximity in order to facilitate in transmission of data or power from one of the electrical conductors 113, 413 to the other of the electrical conductors 113, 413. Both MCEI surfaces are parallel to the plane 114. When current is passed through one of the electrical conductors 113, 413 a magnetic field is generated according to Ampere's law with a direction defined by the right hand rule.

For example, when an electric current passes through electric conductor 113 in a direction into the page on the left side of inductive coupler 101 and out of the page on the right side of inductive coupler 101, a magnetic field is generated in the MCEI material 301 of the MCEI surface 111 which curls clockwise around the conductor at the left side and counter-clockwise on the right side, as represented by the arrows.

Magnetic fields tend to take the path of least resistance to return to their origin. MCEI material 301, 317 provides a path of low magnetic resistance encircling both conductors 113, 313, thereby providing efficient coupling between the two circuits. A current induced in either conductor is mirrored in the other.

Figure 5:
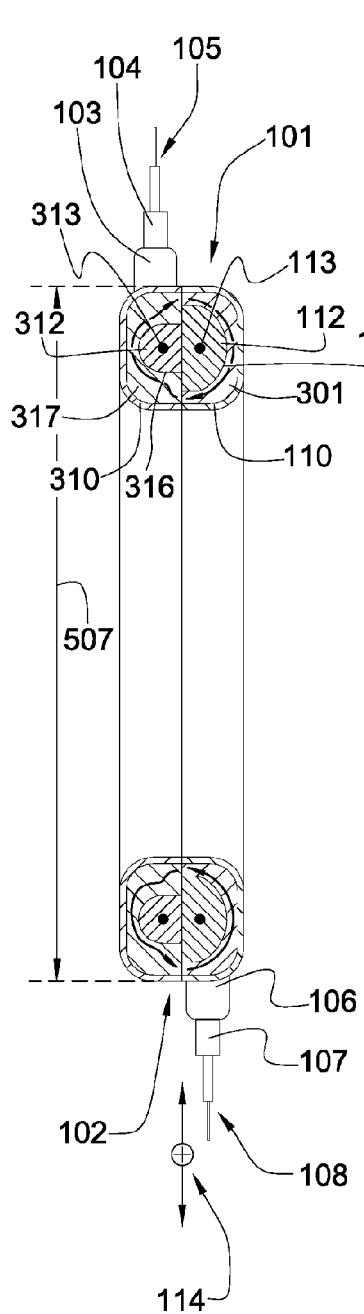
FIG. 5 is a side cross-sectional view of a data transmission apparatus wherein the first and second surfaces are aligned.
Figure 6:
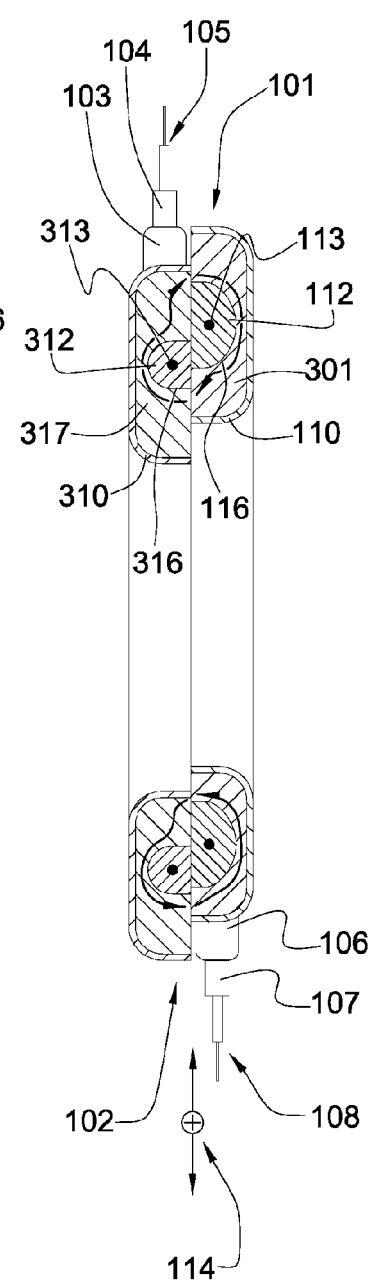
FIG. 6 is a side cross-sectional view of a data transmission apparatus wherein the first surface has been laterally translated in a first direction.
Figure 7:
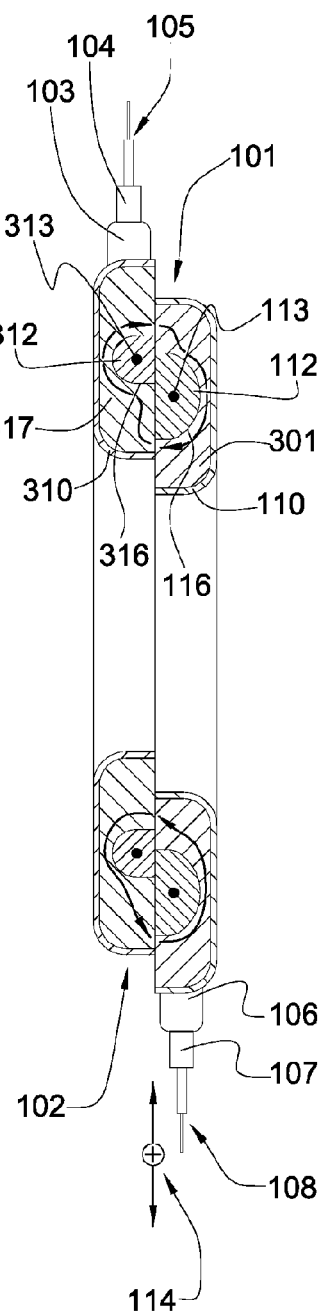
FIG. 7 is a side cross-sectional view of a data transmission apparatus wherein the first surface has laterally been laterally translated in a second direction.

Referring now to FIGS. 5-7 cross-sectional views along the longer dimension of data apparatus 100 demonstrate how inductive coupler 102 may be translated along the plane 114 while maintaining electromagnetic communication between the electrical conductors 113, 313, thereby facilitating bidirectional transfer of data or power. In order to achieve this electromagnetic communication, two requirements must be met: First, a magnetic path must enclose both conductors 113, 313. Secondly, there must be no magnetic short circuit around either conductor.

In FIG. 5 inductive couplers 101, 102 are substantially aligned in both dimensions along plane 114. The magnetic path around both electrical conductors 113, 313 is indicated by the arrows.

In FIG. 6 inductive coupler 102 has been translated downward along plane 114 with respect to inductive coupler 101. However due to the respective widths of recesses 116, 316 electromagnetic communication between electrical conductors 113, 313 of the couplers 101, 102 is still present, as indicated by the arrows through the electromagnetic MCEI material 301, 317.

In FIG. 7 inductive coupler 102 has been translated upward along plane 114 with respect to inductive coupler 101. A magnetic path around both electrical conductors 113, 313 still exists.

It is possible for one of the inductive couplers 101, 102 to be translated upward or downward to a greater extent than is shown in FIGS. 5-7 and still maintain some degree of electromagnetic communication between electrical conductors 113, 313. Even if most or all electromagnetic communication along width dimension 218 of FIG. 2 is lost, electromagnetic communication may still occur between the electrical conductors 113, 313 along the length dimension 207. This will be the case as long as no electrically conductive material comes close to the open portions of the electrical conductors. If an electrical conductor, and in particular a magnetic electrical conductor, were to come in close proximity to exposed portions of conductors 113, 313, eddy currents would be induced in the proximate conductor that would drain power from the signal.

Thus some embodiments of the invention may comprise a smaller inductive coupler configured to slide up and down or side to side along the length of a larger inductive coupler in order to maximize lateral translation possibilities. (See the description of FIGS. 12-14 for such one such embodiment). In such configurations, it is not necessary that there be electromagnetic communication along the entire length of the conductor loop.

Figure 8:
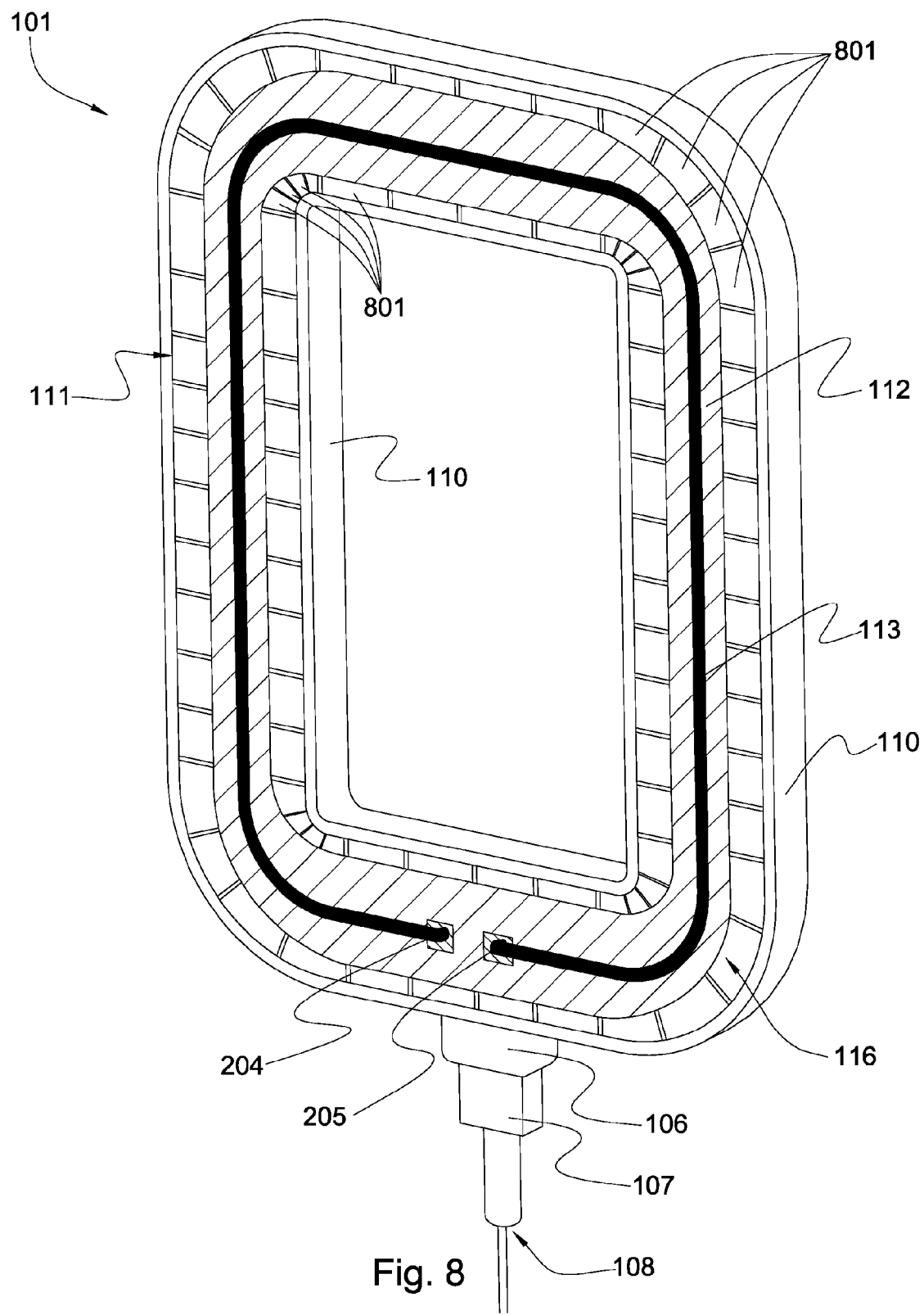
FIG. 8 is a perspective view of an inductive coupler in a data transmission apparatus with a segmented magnetically conductive, electrically insulating surface.

Inductive couplers according to the invention may often be subjected to high shock or stress. Referring now to FIG. 8, the MCEI surface 111 may comprise a plurality of MCEI segments 801, each segment 801 comprising a recess 116 to house a portion of the electrical conductor 113. The MCEI segments 801 may be U-shaped pieces of an MCEI material such as ferrite. Use of multiple MCEI segments will protect the MCEI surface 111 from fracturing under conditions of high stress.

Figure 9:
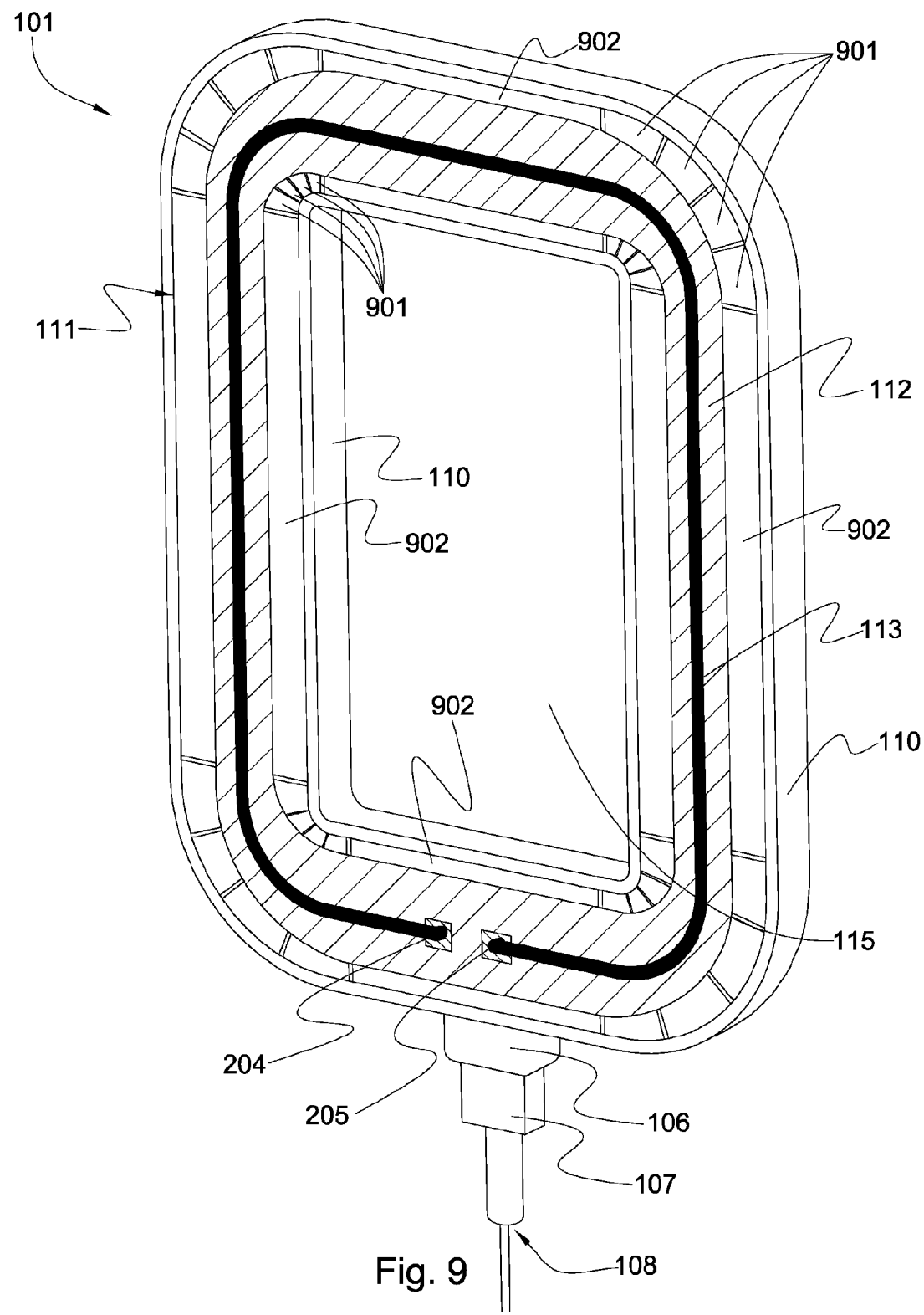
FIG. 9 is a perspective view of an inductive coupler in a data transmission apparatus with a magnetically conductive, electrically insulating surface that is segmented around the corners.

Referring now to FIG. 9, inductive coupler 100 may comprise an MCEI surface 111 that comprises longer segments 902 of MCEI material along its sides and shorter, more curved segments 901 around the corners. Such a configuration may provide a substantial mechanical benefit with reduced assembly cost.

Figure 10:
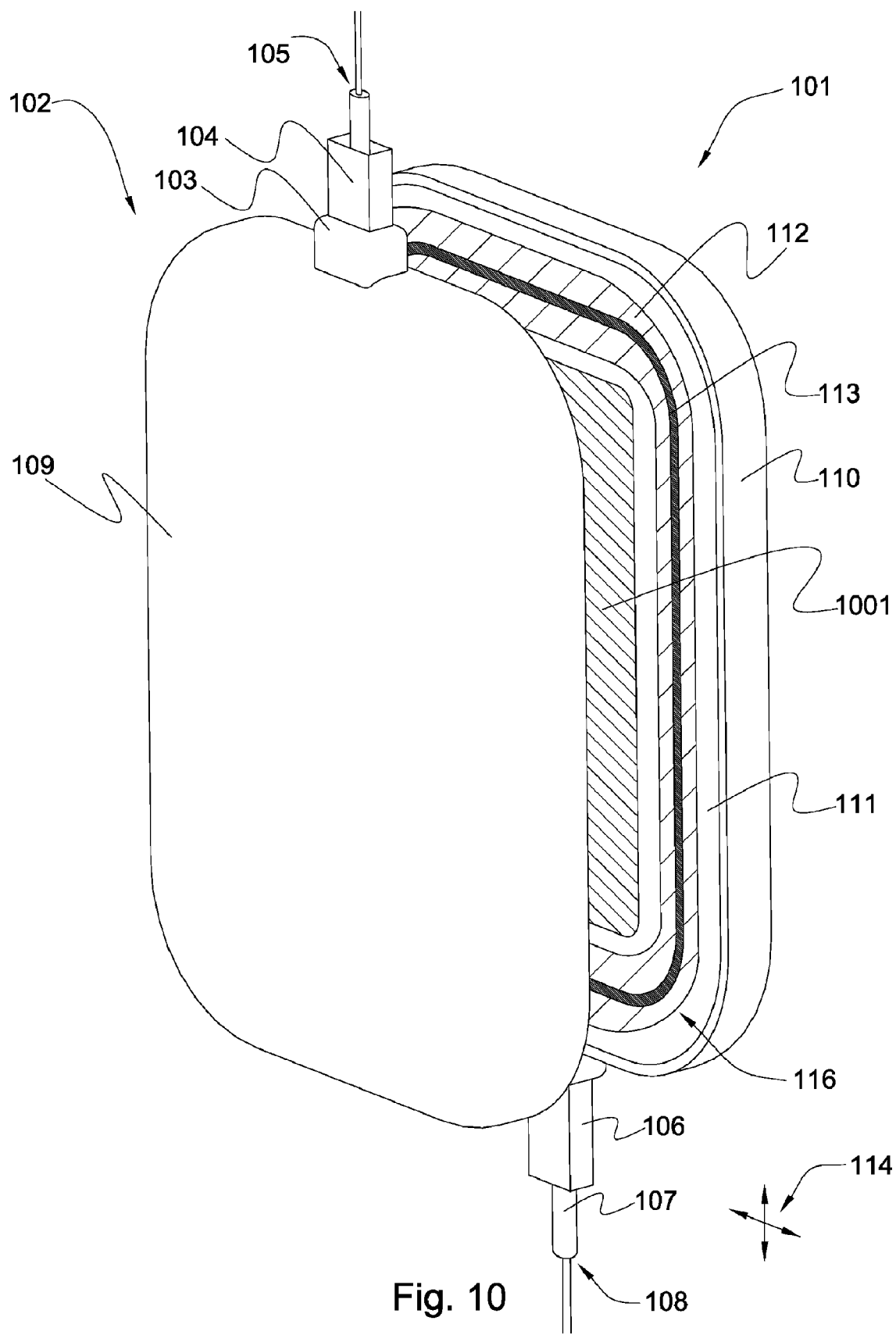
FIG. 10 is a perspective view of another embodiment of a data transmission apparatus.

Referring now to FIG. 10, another embodiment of the present invention may comprise additional material 1001 that may occupy the area enclosed by the inner-side of recess 116. Material 1001 may be an MCEI material, a dielectric material, or a material chosen for its ability to strengthen the coupler and to protect it against harsh operating conditions.

Figure 11:
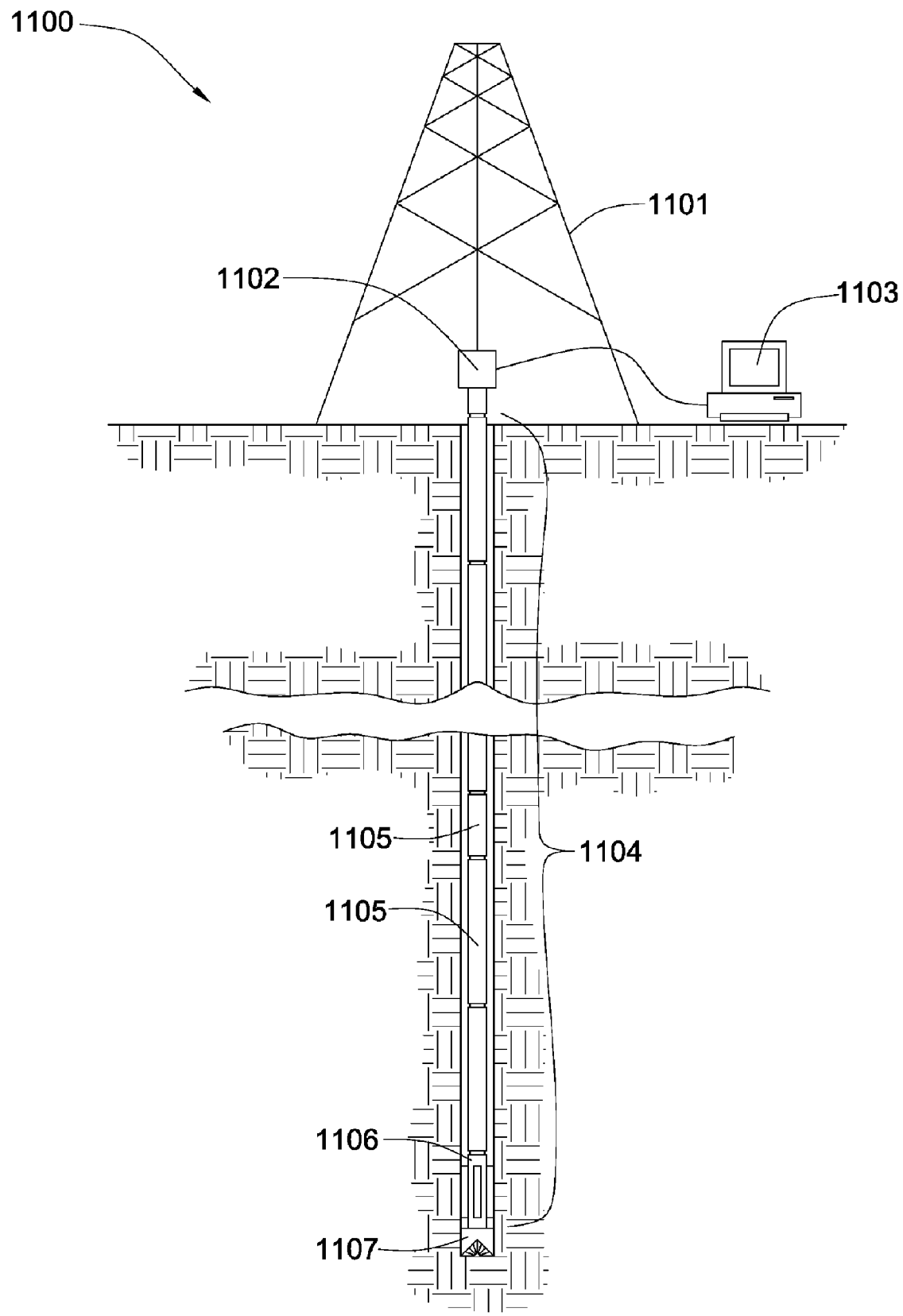
FIG. 11 is a diagram of an embodiment of a downhole network consistent with the present invention.

A data transmission apparatus 100 according to the present invention may be used in one or more tools in a network. Referring now to FIG. 11, a downhole network 1100 may comprise one or more downhole tool string components 1105, 1106, 1107 linked together in a tool string 1104 and in communication with surface equipment 1103. Data may be transmitted up and down the tool string 1104 and between different tool components 1105, 1106, 1107.

The tool string 1104 may be suspended by a derrick 1101. Data may be transmitted along the tool string 1104 through techniques known in the art. A preferred method of downhole data transmission using inductive couplers disposed in tool joints is disclosed in the previously mentioned U.S. Pat. No. 6,670,880 to Hall, et al, (hereafter referenced as the '880 patent). Alternate data transmission paths 29 may comprise direct electrical contacts in tool joints such as in the system disclosed in U.S. Pat. No. 6,688,396 (hereafter referred to as the '396 patent) to Floerke, et al., which is herein incorporated by reference for all that it discloses. Another data transmission system that may be adapted for use with the present invention is disclosed in U.S. Pat. No. 6,641,434 to Boyle, et al. (hereafter referred to as the '434 patent), which is also herein incorporated by reference for all that it discloses.

A data swivel 1102 may facilitate the transfer of data between the rotatable tool string 1104 and the stationary surface equipment 1103. Downhole tool string components 1105 may comprise drill pipes, jars, shock absorbers, mud hammers, air hammers, mud motors, turbines, reamers, under-reamers, fishing tools, steering elements, MWD tools, LWD tools, seismic sources, seismic receivers, pumps, perforators, other tools with an explosive charge, and mud-pulse sirens. The lowermost component 1107 is usually a drill bit.

A downhole shock absorber 1106 may be a part of the tool string 1104 and be configured to allow the tool string 1104 to absorb shock without damaging portions of the string or equipment attached to the string. The downhole shock absorber may also allow the drill bit 1107 to maintain a constant amount of mechanical force on a subterranean formation without adverse effects on the tool string due to jolts and shocks in the drilling process.

Network 1100 in the tool string 1104 may enable high-speed communication between each device connected to it. However, some tool string components, such as a downhole jar or shock absorber 1106, may require an embodiment of the present invention to enable data transmission across parts that move relative to each other.

Figures 12, 13:
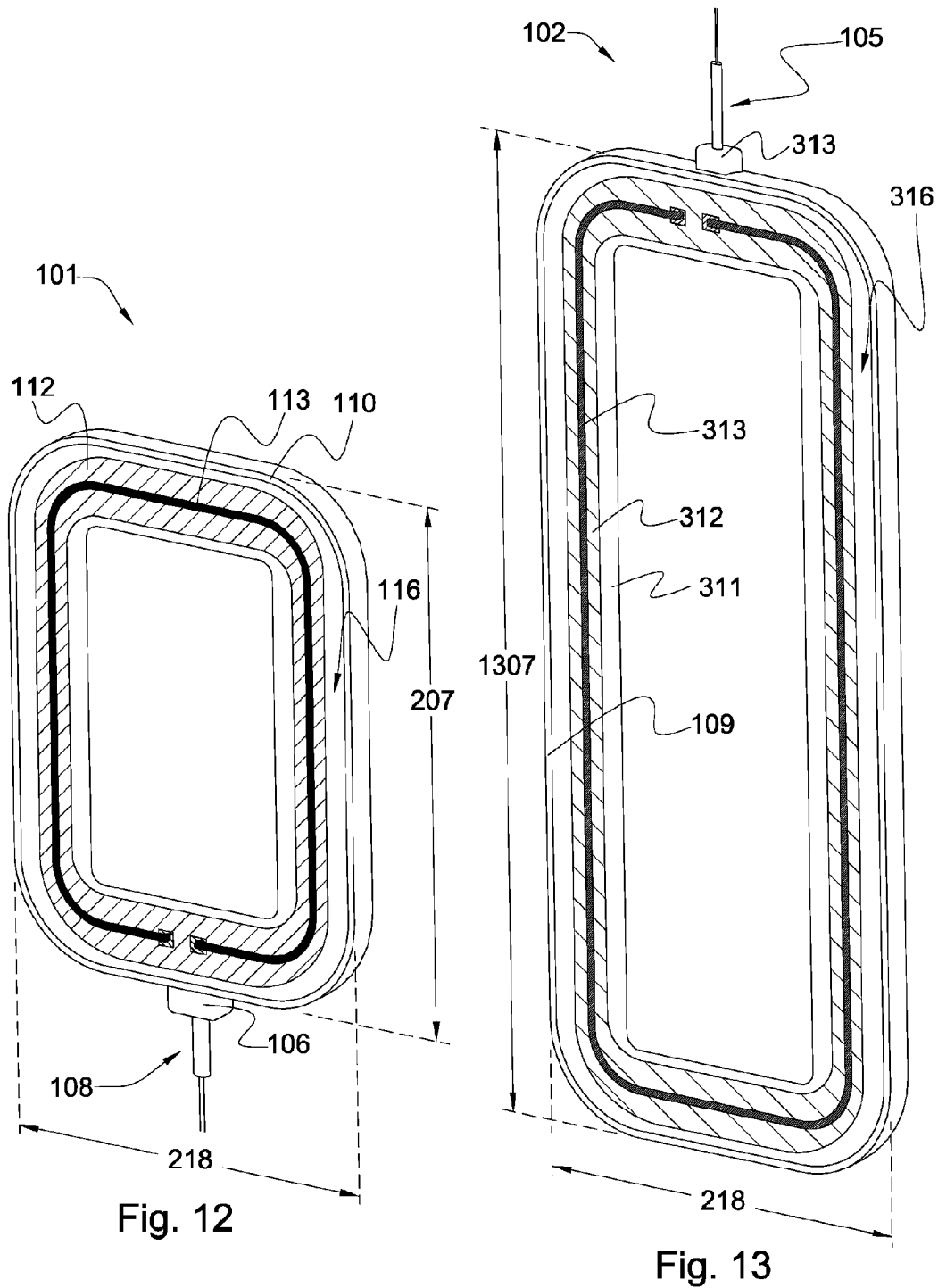
FIG. 12 is a perspective view of an embodiment of an inductive coupler.
FIG. 13 is a perspective view of an embodiment of an inductive coupler.
Figure 14:
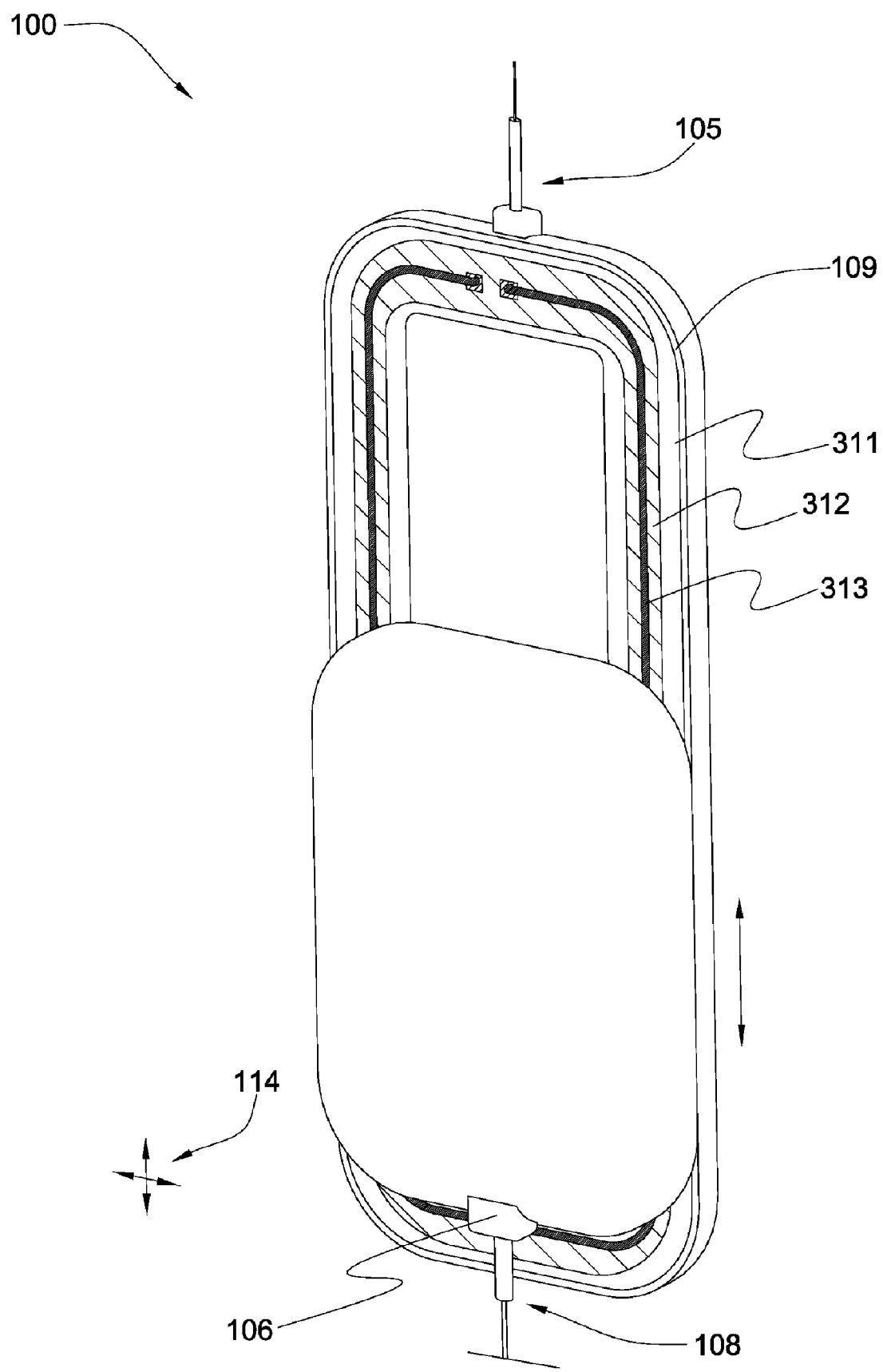
FIG. 14 is a perspective view of an inductive coupling.

Referring now to FIGS. 12-14, another embodiment of the invention comprises one inductive coupler 101 with a length 207 that is substantially less than a length 1307 of the other inductive coupler 102. The width 218 of each coupler 101, 102 may be substantially identical. In such embodiments, inductive coupler 101 may be configured to slide up and down the length 507 of inductive coupler 102 while data transmission occurs between the two couplers 101, 102. While in certain position inductive coupling may occur between electrical conductors 113, 313 along the width 218 of the inductive couplers 101, 102, the majority of the inductive coupling will usually occur along the length 207 of inductive coupler 101.

In certain embodiments it may be advantageous to provide repeaters (not shown) in close proximity to one or both inductive couplers 101, 102 to amplify data signals that are transmitted and received. In this particular embodiment, coaxial cables 108, 105 will couple the signal to a repeater housed within the same tool.

Figure 15:
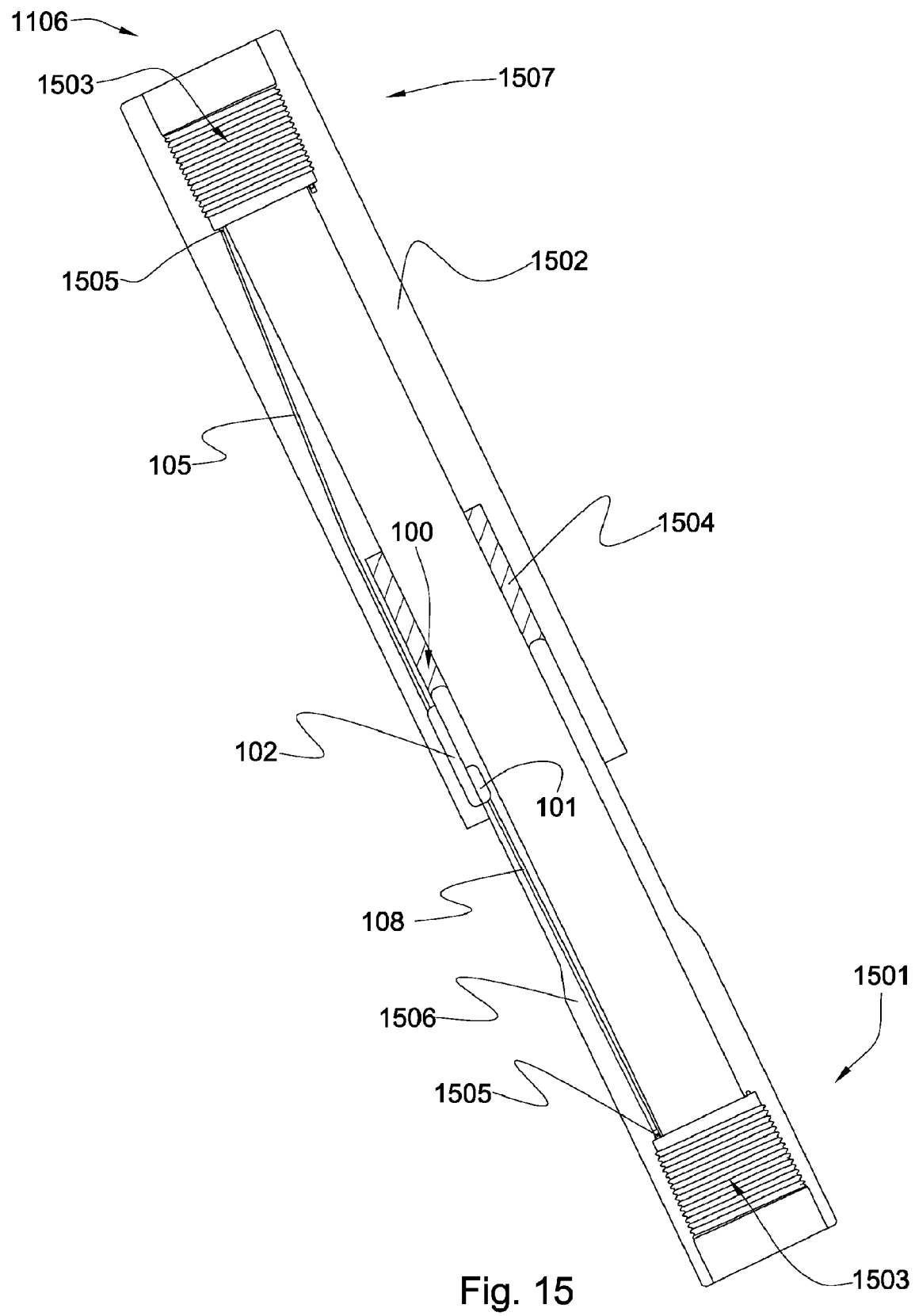
FIG. 15 is a perspective view of a shock absorber.

Referring now to FIG. 15, a cross-sectional view of one embodiment of a shock absorber 1106 according to the present invention is shown. It may typically be employed in or near the bottom-hole portion of the tool string, as shown in FIG. 11. The shock absorber may comprise a tubular housing 1502 with a mandrel 1506 at least partially coaxially disposed within the housing 1502. The mandrel 1506 is axially translatable with respect to the tubular housing 1502 (as indicated by the arrows). The mandrel 1506 comprises a first end 1501 that may connect to the drill bit 1107 or another to a downhole tool string component 1105 by means of mated threading 1503. The tubular housing 1502 comprises a second end 1507 that couples to the tool string 1104 through mated threading 1503. Under drilling operations, shocks or jolts may cause tubular housing 1502 to axially with respect to the tubular housing 1502.

Axial translation by the mandrel 1506 will cause shock absorbent material 1504 in the tubular housing 1502 to compress and absorb mechanical energy from the mandrel. In some embodiments the shock absorbent material 1504 may comprise a hydraulic spring. In other embodiments the shock absorbent material 1504 may comprise a mechanical spring, a compressible polymer, or other shock absorbent material known in the art.

The present invention enables the shock absorber 1106 to be configured to transmit data from the first end 1501 to the second end 1507. Data couplers 1505 consistent with the aforementioned '880, '396, or '434 patents, or any other applicable data couplers known in the art may be provided in both the first end 1501 and the second end 1507 to interface with the downhole network 1100 shown in FIG. 11. A data transmission apparatus 100 consistent with the invention (such as the embodiment shown in FIGS. 12-14) will facilitate data transmission between the mandrel 1506 and the tubular housing 1502. As the mandrel 1506 is translated axially with respect to the housing 1502, inductive coupler 101 will slide along the length 1307 (see FIG. 13) of inductive coupler 102. Data conductors 105, 108 connect the inductive couplers 101, 102 to data couplers 1505.

Figure 16:
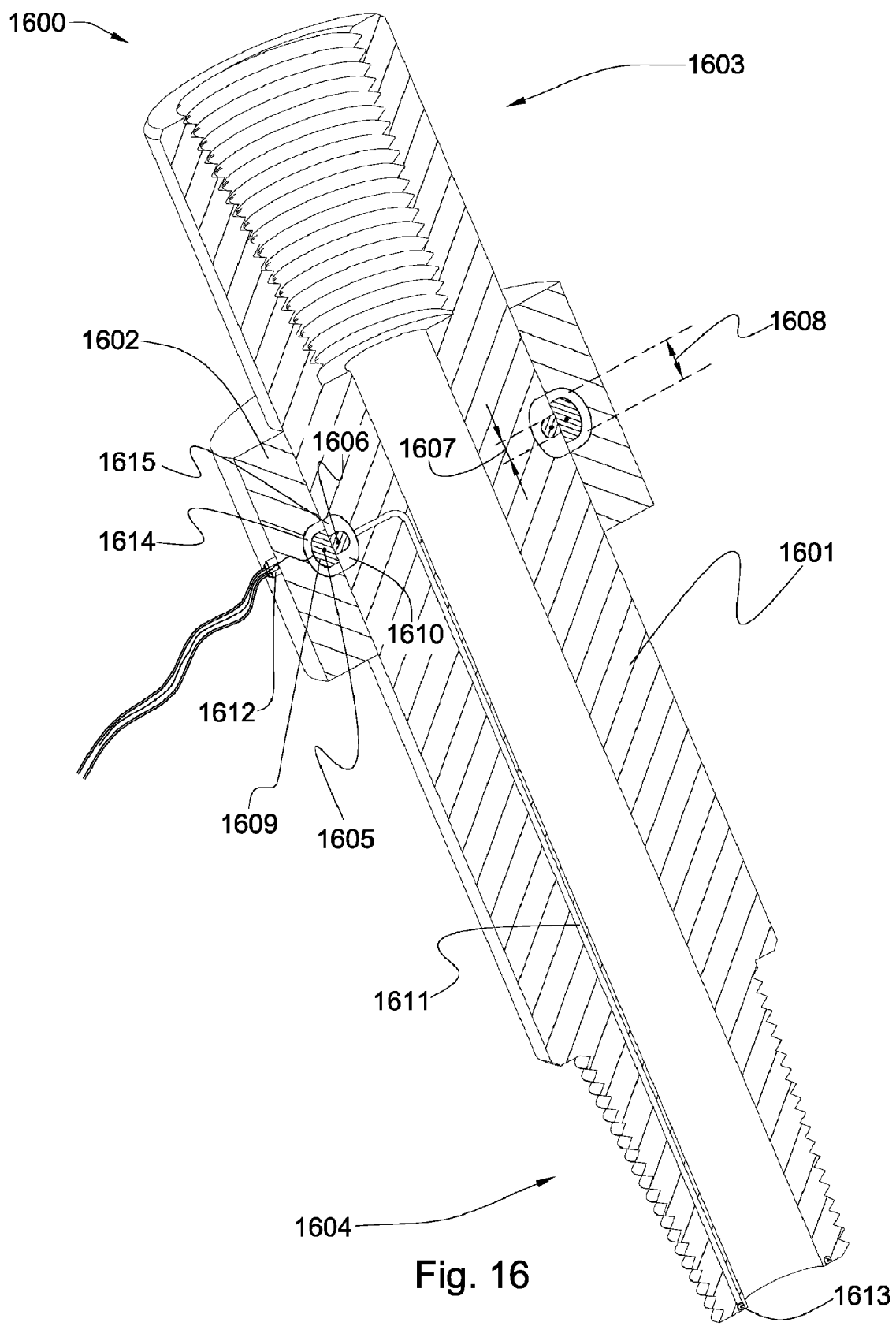
FIG. 16 is a perspective view of a rotary inductive coupling.

Referring now to FIG. 16 a data transmission apparatus 1600 consistent with the current invention provides the functionality required for the data swivel 1102 of FIG. 12. The data swivel may comprise a tubular rotor 1601 coaxially disposed within a stator 1602. The rotor 1601 may couple to a tool string on one end 1604 and to a top-hole drive or kelly (not shown) at another end 1603. The data swivel 1102 may be configured to transmit data between stationary surface equipment 1103 and downhole tool string components 1105, 1106, 1107 (See FIG. 12.) A data coupler 1613 in pin end 1604 may interface with the downhole network 1100 in the tool string 1104. The data coupler 1505 may be in electrical communication with the data transmission apparatus 1600 through data conductor 1611. The data conductor may be a coaxial cable.

The data transmission apparatus 1600 comprises a first electrical conductor 1606 disposed within a first recess 1607 of a first substantially cylindrical magnetically conducting electrically insulating surface 1615. A second electrical conductor 1605 may be disposed within a second recess 1608 of a second substantially cylindrical magnetically conducting electrically insulating surface 1614. The outer surface of the rotor 1601 may be continuous with the MCEI surface 1615. The inner surface of the stator 1602 may be continuous with the second MCEI surface 1614. The first and second surfaces 1615, 1614 are coaxial to each other and maintained in as close proximity as possible by means of suitable bearings, not shown. The first recess 1607 may be smaller than the second recess 1608.

The recesses 1607, 1608 further comprise a dielectric material 1609, 1610 in which the electrical conductors 1606, 1605 are embedded. Wear arising from use or machining tolerances in the bearings of the data swivel may cause the rotor 1601 to move or vibrate axially with respect to the stator 1602 (as indicated by the arrows), causing first surface 1615 to move axially with respect to the second surface 1614. The same principles disclosed in the description of FIGS. 5-7 will maintain data and/or power transmission between the first and second electrical conductors 1606, 1605.

The stator 1602 may interface with the surface equipment 1103 (FIG. 12) through a connector 1612 on the outside of the stator 1602. Inductive couplings similar to the coupling described in FIG. 16 may be used in downhole motors or mud turbines or in other components of a tool string that necessitate rotary motion accompanied by axial vibration or displacement.

Figure 17:
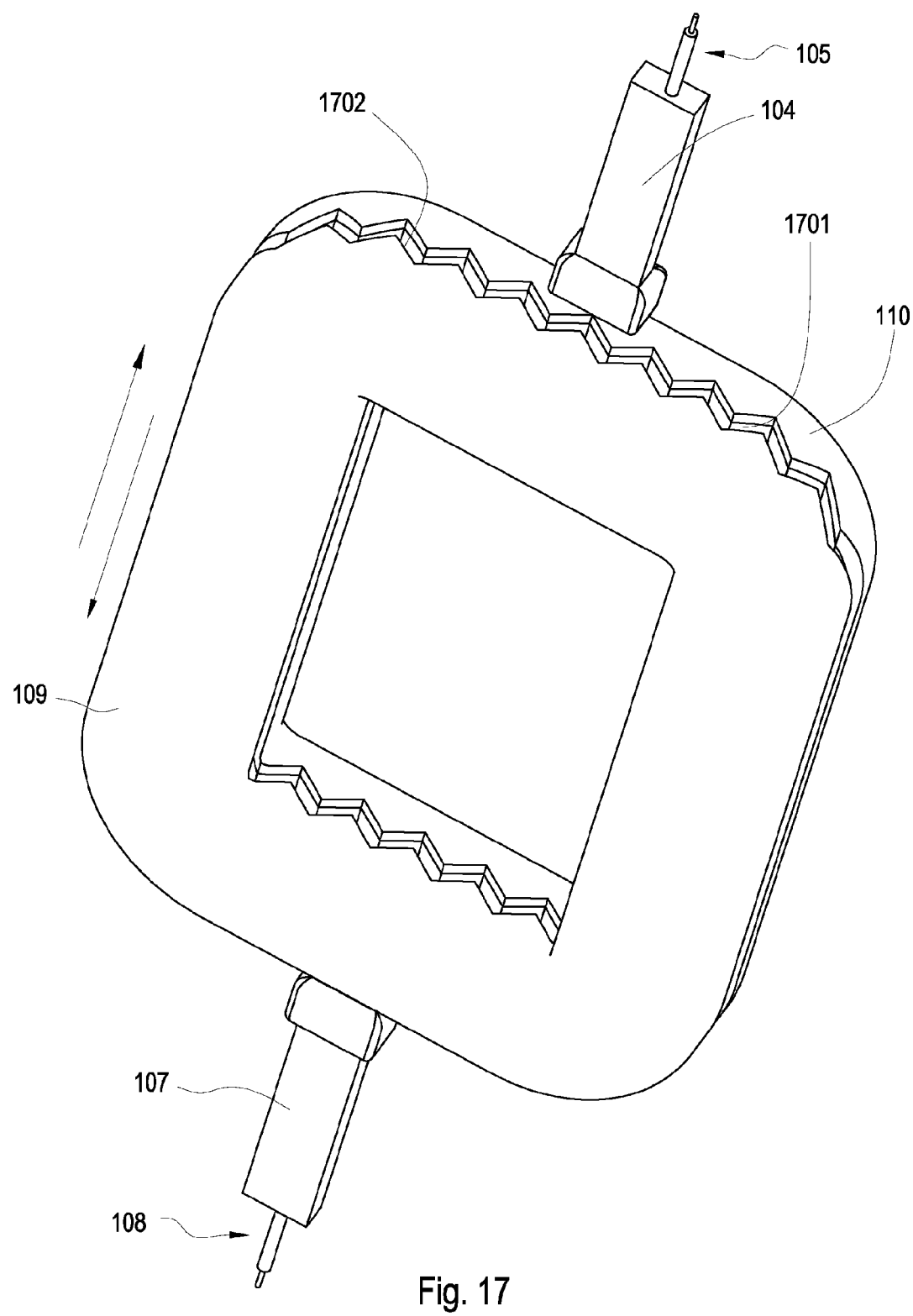
FIG. 17 illustrates an embodiment of the invention that is translatable in one direction and embodies a non-planar interface.
Figure 18:
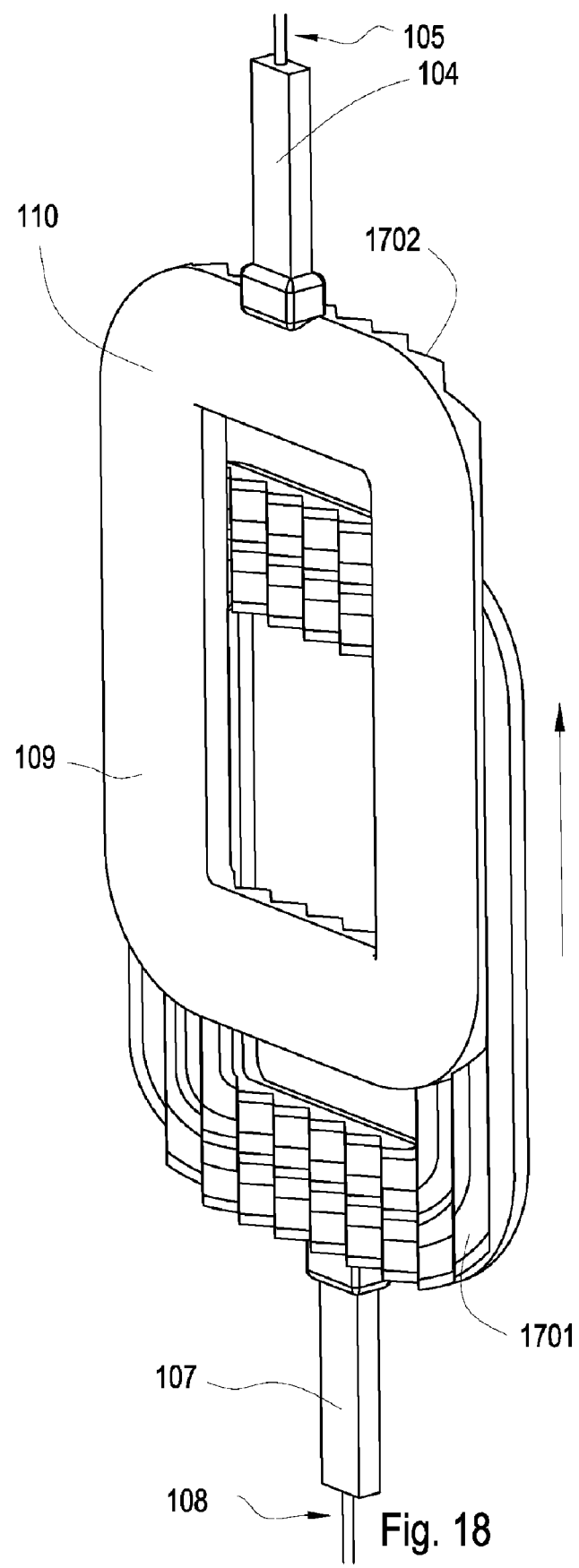
FIG. 18 illustrates the embodiment of FIG. 17 wherein the first inductive coupler has been longitudinally translated with respect to the second inductive coupler.

Referring now to FIGS. 17-18, an embodiment of the data transmission apparatus 100 comprises first and second non-planar magnetically conductive, electrically insulating surfaces 1701, 1702. The embodiment shown comprises the surfaces 1701, 1702 with recesses 116, 316 having a dielectric material 112, 312 in which electrical conductors 113, 313 are disposed, similar to other embodiments (see FIGS. 1-4). The notched characteristic of the first and second non-planar magnetically conductive, electrically insulating surfaces 1701, 1702 permits the first surface 1701 to be longitudinally translatable (as indicated by the arrows) with respect to the second surface 1702 while maintaining latitudinal alignment. The electrical conductors 113, 313 will be in electromagnetic communication during longitudinal translation of the first surface 1701.

In other embodiments, the data transmission apparatus 100 may comprise first and second non-planar magnetically conductive, electrically insulating surfaces 1701, 1702 of different shapes than the notched embodiment shown. For example, the surfaces 1701, 1702 may comprise an interface with elliptical, triangular, or other shaped properties while maintaining latitudinal alignment and longitudinal translatability of the first surface 1701.

Whereas the present invention has been described in particular relation to the drawings attached hereto, it should be understood that other and further modifications apart from those shown or suggested herein, may be made within the scope and spirit of the present invention.

What is claimed is:

1. A data transmission apparatus comprising:
   a first electrical conductor disposed within a first recess of a first magnetically conducting, electrically insulating complementary surface having a length and a width;
   a second electrical conductor disposed within a second recess of a second magnetically conducting, electrically insulating complementary surface having a length and a width; and
   the first surface being opposite the second surface and translatable along the length of the second surface;
   wherein data transmission is enabled between the first and second electrical conductors as the first surface overlaps the second surface.

2. The apparatus of claim 1, wherein the first and second recesses comprise a dielectric material with low magnetic permeability.

3. The apparatus of claim 2, wherein the first and second electrical conductors are embedded in the dielectric material in the first and second recesses, respectively.

4. The apparatus of claim 1, wherein the first and second magnetically conducting electrically insulating surfaces have a generally rectangular shape.

5. The apparatus of claim 1, wherein the first and second surfaces are parallel to and translatable with respect to a plane.

6. The apparatus of claim 1, wherein a portion of the second recess corresponding to the width dimension of the second surface is wider than a portion of the first recess corresponding to the width dimension of the first surface.

7. The apparatus of claim 1, wherein at least one of the magnetically conducting electrically insulating surfaces comprises a plurality of magnetically conducting electrically insulating segments.

8. The apparatus of claim 1, wherein at least one of the magnetically conducting electrically insulating surfaces comprises ferrite.

9. The apparatus of claim 1, wherein the apparatus is located in a downhole tool.

10. The apparatus of claim 9, wherein the downhole tool is selected from the group consisting of jars, shock absorbers, mud hammers, air hammers, mud motors, turbines, reamers, under-reamers, fishing tools, steering elements, MWD tools, LWD tools, seismic sources, seismic receivers, pumps, perforators, other tools with an explosive charge, and mud-pulse sirens.

11. The apparatus of claim 1, wherein at least one of the electrical conductors comprises an electrical coil.

12. The apparatus of claim 11, wherein the electrical coil is a single-turn electrical coil.

13. The apparatus of claim 1, wherein a first end of each electrical conductor is connected to a data conductor.

14. The apparatus of claim 13, wherein the data conductor is a coaxial cable.

15. The apparatus of claim 13, wherein a second end of each electrical conductor is connected to ground.

16. The apparatus of claim 1, wherein the second surface is translatable along the plane with respect to the first surface.

17. A data transmission apparatus comprising:
a first electrical conductor disposed within a first recess of a first magnetically conducting, electrically insulating complementary surface having a length and a width;
a second electrical conductor disposed within a second recess of a second magnetically conducting, electrically insulating complementary surface having a length and a width;
the first and second complementary surfaces facing each other and being substantially aligned widthwise; and
the first surface being translatable along the length of the second surface;
wherein the first and second electrical coils are in electromagnetic communication.

18. The apparatus of claim 17, wherein the electrical conductors are embedded in a dielectric material having low magnetic permeability.

19. The apparatus of claim 17, wherein at least one of the magnetically conducting electrically insulating mating surfaces comprise a plurality of magnetically conducting electrically insulating segments.

20. The apparatus of claim 17, wherein the apparatus is located in a downhole tool.

21. The apparatus of claim 17, comprising a first end of each electrical coil in electrical communication with a data transmission system and a second end of each electrical coil in electrical communication with ground.

22. The apparatus of claim 17, wherein the first and second mating surfaces are non-planar.

23. A data transmission apparatus comprising:
a first electrical conductor disposed within a first recess of a first substantially cylindrical magnetically conducting, electrically insulating surface;
a second electrical conductor disposed within a second recess of a second substantially cylindrical magnetically conducting, electrically insulating surface;
the first and second surfaces facing each other being substantially coaxial to one another; and
the first surface being axially translatable with respect to the second surface;
wherein the first and second electrical conductors are in electromagnetic communication.

24. The data transmission apparatus of claim 23, wherein the electrical conductors are embedded in a dielectric material having low magnetic permeability.

25. The data transmission apparatus of claim 23, wherein the electrical conductors are electrical coils.

26. The data transmission apparatus of claim 25, wherein each electrical coil comprises a first end in electrical communication with a data transmission system and a second end in electrical communication with ground.

* * * * *